Patented Nov. 13, 1923.

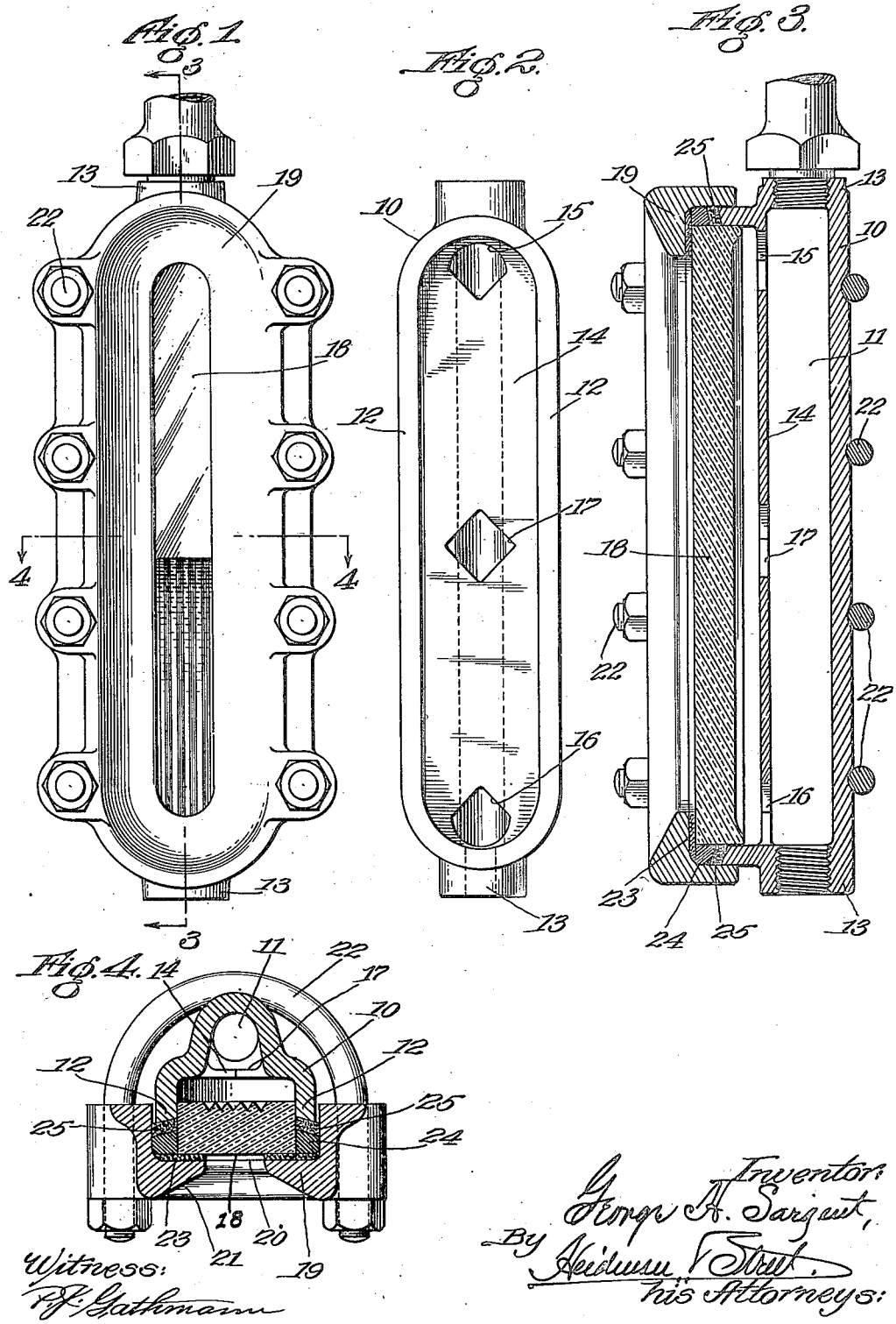

1,473,741

UNITED STATES PATENT OFFICE.

GEORGE H. SARGENT, OF CHICAGO, ILLINOIS.

WATER GAUGE.

Application filed September 19, 1921. Serial No. 501,745.

*To all whom it may concern:*

Be it known that I, GEORGE H. SARGENT, a citizen of the United States, and a resident of Chicago, in the county of Cook and State of Illinois, have invented certain new and useful Improvements in Water Gauges, of which the following is a description, reference being had to the accompanying drawing, which forms a part of my specification.

My invention relates to improvements in water gauges of the type employed with steam boilers and the like for the purpose of indicating the fluid level, under pressure, in the boiler or containers to which the gauge is applied; the invention, more specifically stated, pertaining to the type of water gauge comprising a metallic shell or casing formed to provide a water-receiving chamber extending longitudinally through the gauge and adapted to have communication with the boiler or container at the upper and lower ends thereof in the manner usual with such gauges; the gauge also employing a suitable sight-glass which is adapted to constitute one wall of the gauge and therefore of the water chamber; the sight-glass or transparent wall being made water and steam tight by means of suitable gaskets or resilient packing; the sight-glass and packing being maintained in place by a removably bolted or secured cover-plate or front wall section.

The invention, in the particular exemplification employed in the drawing, embodies a sight-glass of the Klinger type, with prismatic formations or a number of longitudinally disposed facets or surfaces on the inner side thereof whereby a proper reflection of the light rays is produced and the water level thereby more readily discerned because of the clear demarcation produced by the reflected light rays.

It has been found in practice that the inner surface is subject to deterioration due to the action of the water and steam passing through the gauge especially when said elements flow through the gauge with more or less velocity; as well as a result of the action of the distilled water coming from the upper or steam end of the water gauge fittings and contacting with the glass. In order to eliminate or retard the deteriorating actions above referred to, I have provided an improved gauge wherein the water-holding portion of the gauge is provided with an intermediate metallic partition disposed longitudinally of the gauge so as to provide a main water-holding portion or chamber rearward of the partition and a secondary water-receiving chamber forward of the partition and immediately adjacent to the sight-glass; the main water-holding portion or chamber being in direct alignment with and directly communicating with the gauge fittings or connections at top and bottom whereby communication with the boiler or container is established. With my improved gauge the principal flow of the water will take place in the main water-holding portion or chamber and therefore at a point removed from the inner face of the sight-glass so that the dissipating action on or erosion of the inner surface of the sight-glass will be materially retarded. The invention specifically stated, therefore, contemplates a gauge wherein the intermediate metallic partition is so formed that proper communication between the two chambers will obtain to assure a mean water level in the gauge body on both sides of the partition.

My invention also contemplates a water gauge of the character referred to wherein the front wall or sight-glass retaining member is so formed as to receive suitable packing whereby the sight-glass is retained in place; the packing-receiving portion or socket of the front wall or cover section being formed to receive the side walls of the main or body portion which are formed to constitute gland portions whereby the packing is properly compressed into snug relation with the marginal sides of the sight-glass to provide fluid-tight relation therewith without subjecting the glass to improper pressures or strains.

The objects and advantages of my invention will all be more fully comprehended from the detailed description of the accompanying drawing, wherein:—

Figure 1 is a front elevation of my improved gauge.

Figure 2 is a front elevation of the main or body portion with the cover member and sight glass removed.

Figure 3 is a longitudinal sectional view taken on the line 3—3 of Figure 1.

Figure 4 is a cross sectional view taken on the line 4—4 of Figure 1 looking in the direction of the arrows.

The invention, as disclosed in the drawing, comprises a main member or body portion 10 of suitable metal formed to provide a longitudinal channel or chamber 11 extending from end to end and open at the front; the sides or front wall of the main member 10 being extended forwardly about the opening to provide flanges or glands as at 12, 12 which are preferably provided with beveled surfaces as more clearly shown in Figures 3 and 4 and made continuous about the upper and lower ends of the opening in the front face of the body portion; that is to say, about the water-chamber part thereof as clearly shown in Figure 2. The ends of the main member or body portion 10 are preferably provided with apertured bosses as at 13, 13 adapted to receive proper connections or tubular extensions whereby communication with the interior of the boiler or container may be effected at proper points to determine the water level in the container or boiler.

The main member 10, at a point forward of the openings in the ends or bosses, is provided with a partition 14 disposed throughout the length of the body portion and preferably made integral therewith as shown in Figure 3; the partition 14 being arranged at a point somewhat rearward of the beveled edge of the gland-forming sides 12 and at a suitable distance forward of the rear wall of the body portion, to provide a suitable sized water chamber 11 whereby a direct flow through the gauge rearward of the partition will be permitted. The partition 14 at suitable points, preferably at the upper and lower ends and at an intermediate point, is provided with a suitable number of openings, as for example the three openings 15, 16 and 17 and these openings are preferably of angular or curved formation as shown in Figure 2; that is to say, the openings 15 and 16 are shown provided with curved sides adjacent to the ends of the main member, while the opposite sides are made angular; and the intermediate opening 17 is preferably provided with angular sides or edges throughout as shown. The purpose of the openings is to permit the water to pass through to the forward side of the partition 14 and assure a water level forward of the partition similar to that in the main channel or chamber 11; and the object in forming the openings angular and partially semi-circular, is to prevent a mis-reading of the gauge; the peculiar configurations of the openings obviating the possibility of horizontal shadows or straight lines being disposed transversely of the gauge when viewed through the sight-glass, as such shadows or lines might be confused with or have the appearance of a horizontal water level.

The extended sides or gland portions 12 are intended to receive the inner edge or face of a sight-glass 18, which, in the exemplification of the Klinger type, is provided with a number of facets or reflecting surfaces whereby the light on the portion of the glass covered by the liquid is permitted to pass therethrough, while the light on the facets of the glass not covered by the liquid will be entirely or partially reflected, thereby producing a decided line at the water level which may be easily and plainly discerned at a distance from the gauge. In view of the proximity of the diaphragm or partition 14 to the inner reflecting surface of the sight-glass 18, I deem it advisable to make the openings 15, 16 and 17 in the partition in the manner previously described, to wit by making the openings with irregular or curved and angular edges so that there can be no possibility of mistaking the openings rearward of the sight-glass for the level of the water in the gauge in the event that sufficient light should pass through the sight-glass to make such openings visible. With the irregular or angularly and curved openings, it is apparent that there can be no mistaking the outline of the openings for the water level in the gauge.

The front member or metallic cover plate of the gauge shown at 19 is provided with a longitudinal recess of size sufficient to receive the forwardly disposed sides 12 of the main member or body portion 10 as well as to receive the forward edge or surface of the sight-glass 18. The cover member or plate 19 is provided with a longitudinally disposed opening as at 20 disposed throughout the major portion of the sight-glass and therefore throughout the faceted portion or reflecting surface of the sight-glass, and the opening 20 is preferably flared toward the front side as shown at 21 in Figure 4 in order that visibility of the water level may be increased. The cover member or plate 19 is shown provided with apertured extensions or lobes along the longitudinal edges thereof; the apertures being adapted to receive the threaded ends of U-bolts or clamping members 22 which are disposed about the rear sides of the main member or body portion 10, see Figures 3 and 4; the rear wall of the main member being provided with shallow grooves wherein to seat the U-bolts and thus ensure their proper positioning and the maintaining of the main member 10 and front or cover member 19 in juxtaposition. In order to provide fluid-tight relation between the members and with the sight-glass, the cover member 19, along the inner side of the front wall and adjacent to the sight opening 20, is preferably provided with thin gaskets or cushion strips 23, while the socket within the cover member 19 along the sides of the sight-glass 18 is provided with a packing element 24 adapted to extend along both sides of the sight-glass and about the ends thereof. The packing element 24 is preferably mainly composed of rubber; while the side disposed toward the fluid chamber within the main portion 10 is preferably composed of fabric asbestos as at 25 so that the rubber will not be directly exposed to the hot water or steam which might find passage intermediate of the sight-glass and the sides or flange portions 12 of the main member 10. By constructing the surface of the sides or flange portions 12 as shown and described, it is apparent that when the main member 10 and cover member or plate 19 are clamped together, the beveled glands will tend to press the packing into firm relation with the sight-glass 18 and thus ensure a water-tight connection; the packing being likewise forced toward the front wall of the cover member and thus sealing the various joints or connections.

With the construction shown and described, it is apparent that no undue strains can be placed on the sight-glass through the firm clamping together of the two metallic members constituting the gauge, as all compression strains will be entirely taken up by the packing element without transmission to the sight-glass.

With my improved water gauge, wherein the interior, when the various elements are assembled in place, is provided with two water holding chambers having such communication with each other that the same water level will at all times occur in both portions or chambers by reason of the communicating apertures in the division wall or partition, the rear or main chamber is in direct alignment with the communicating conduits or nipples adapted to be secured to the upper and lower ends of the gauge. It is apparent, therefore, that the rapid moving steam and hot water through the gauge, especially in the "blowing out" operation takes place in the main channel or chamber at a point removed from the inner surface of the sight-glass and therefore where it will not have the deteriorating effect on the sight-glass; the water remaining in the main channel rearward of the partition 14, however, also passing into the chamber forward of the partition because of the ports or openings, which are of such configuration as to prevent possibility of misleading the engineman or operator in the event that the marginal edges of the openings should become visible by reason of the employment of a sight-glass which would permit such visibility; that is to say the openings are so formed that the edges or any shadow or line produced thereby will not have the appearance of a horizontal water line.

I have shown and described what I believe to be the simplest and best form of my invention and have described the same in terms employed merely as terms of description and not as terms of limitation, because structural modifications are possible and may be made without, however, departing from the spirit of my invention.

What I claim is:—

1. A water gauge, comprising a body member formed to provide a chamber having openings in the top and bottom walls and provided with an apertured partition disposed from top to bottom at a point forward of said top and bottom openings, said body member being also formed with a gland-forming rim disposed forwardly of the partition to provide a glass-receiving socket, a sight-glass arranged within said socket in spaced relation with said partition to provide a water chamber therebetween, a cover member having a sight opening and adapted to receive said gland-forming rim of the body member and said sight-glass, a packing element located in the cover member forward of the gland-forming rim and adapted to encircle the edges of the sight-glass to maintain the latter in place, and means whereby the body member and cover member are adjustably secured together and the packing element compressed into holding relation with the sight-glass.

2. In a water gauge, a main metallic body portion formed to provide a water chamber having inlet and outlet openings at the ends thereof, a partition disposed from top to bottom at a point forward of said openings, said partition being provided with a plurality of openings whose perimeters are disposed at inclinations to a horizontal plane, said body portion being provided with a reduced forwardly presented continuous rim, and a cover member provided with a sight opening and socketed on its inner face to receive said rim of the body member.

3. A water gauge, comprising a main member open on one longitudinal side thereof, the wall of said member about said opening being extended forwardly to provide a sight-glass receiving socket and to constitute a continuous gland-forming rim, the ends of the main member being provided with connection-receiving apertures, a partition formed integral with the walls of said main member at a point intermediate of the said apertures and the edge of the forwardly presented gland-forming rim, a cover member socketed to receive said forwardly presented rim and a portion of the sight glass, resilient and steam resisting packing elements arranged in said socket of the cover member, adapted to be compressed by said gland-forming rim into intimate relation with the edge of the sight-glass to maintain the latter in place, and means whereby the main member and said cover member are removably secured together.

GEORGE H. SARGENT.

Witnesses:
G. HEIDMAN,
F. A. FLORELL.